United States Patent Office 2,879,299
Patented Mar. 24, 1959

2,879,299
DICYCLOPENTADIEN DERIVATIVES

Karl Büchner, Duisburg, Hamborn, Josef Meis, Oberhausen-Osterfeld, and Otto Roelen, Oberhausen-Holten, Germany, assignors to Ruhrchemie Aktiengesellschaft, Oberhausen-Holten, Germany, a corporation of Germany No Drawing. Application May 25, 1953
Serial No. 357,388

Claims priority, application Germany May 31, 1952

2 Claims. (Cl. 260—598)

This invention relates to improvements in dicyclopentadien derivatives.

Alder and Stein have shown that dicyclopentadien had an unsymmetrical structural formula (see "Angewandte Chemie," vol. 47, page 837) rather than the symmetrical formula as set forth by Bergel and Wiedman, which contains a cyclobutane ring (Liebig's Annalen der Chemie, 467, 76). The unsymmetrical structural formula set forth by Alder and Stein would better account for the chemical behavior of dicyclopentadien and especially with respect to the activity of one of the two unsaturated bonds. This unsymmetrical structural formula is as follows:

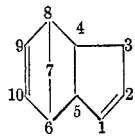

According to Alder and Stein it is possible by partial catalytic reduction to convert dicyclopentadien into a dihydrodicyclopentadien which has the following formula:

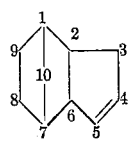

which, according to the Geneva nomenclature, is designated as tricyclodecene $4[5,2,1,0^{2.6}]$. This compound according to the Geneva numbering has its double bond between the fourth and fifth carbon atom.

One object of this invention is the production of new and useful aldehyde and alcohol derivatives of dicyclopentadien. This, and still further objects will become apparent from the following description.

It has now been found in accordance with the invention that new and useful aldehydes and aldehyde derivatives, such as alcohols, having the oxygen-containing groups positioned in the five-membered ring, may be obtained from dicyclopentadien.

In accordance with the invention, dicyclopentadien is subjected to a mild hydrogenation at temperatures below 100° C. with, if necessary or desired, the addition of diluent hydrocarbons. Carbon monoxide and hydrogen are then added to the hydrocarbon mixture obtained from the mild hydrogenation in accordance with the oxo synthesis. This carbon monoxide hydrogen addition by the oxo synthesis will form an aldehydic reaction product. This aldehydic reaction product is then subjected to a hydration and hydrogenation or to a hydrating hydrogenation.

When effecting the mild hydrogenation with a kieselguhr supported nickel catalyst, which generally requires a temperature of about 130° C. for optimum hydrogenation conditions, the maximum hydrogenation temperature in accordance with the invention should not exceed 100° C. Sufficiently low hydrogenation temperatures may be used when diluting the dicyclopentadien with other hydrocarbons such as heptane or benzene. When diluting 4 parts of dicyclopentadien with 1 part of heptane, a hydrogenation temperature of 85° C. will suffice with these catalysts. With a dilution of 1 part of heptane per part of dicyclopentadien a maximum hydrogenation temperature of approximately only 75° C. is required. In any event, the hydrogenation is discontinued as soon as an amount of hydrogen calculated for saturation of one of the double bonds of the dicyclopentadien is absorbed. When one of the double bonds is saturated with hydrogen, the iodine number of the mixture will drop to approximately half its value.

The reaction product obtained by this mild or partial hydrogenation may be subjected after separation of the catalyst to the aldehyde reaction, i.e., the carbon monoxide hydrogen addition according to the oxo synthesis. Conventional oxo synthesis catalysts, as, for example, solutions which contain approximately 8–16 grams of cobalt in the form of cobalt compounds and 15–30 grams of magnesium oxide in the form of magnesium compound per liter may be used in the conventional manner for this purpose. It has been found of particular advantage to use an oxo synthesis catalyst which is in the form of a weakly acid aqueous cobalt sulfate-magnesium sulfate solution. The water gas to be added should be under a pressure of about 150 kg. per square centimeter. The reaction temperature averages about 150° C.

After termination of the water gas absorption which requires from about 2–3 hours, the aldehydic product is separated from the aqueous salt solution used as a catalyst, mixed with 10–30% of its volume of water and treated in a pressure vessel at a temperature of approximately 200° C. This will effect hydration of the product. The metal-free and acetal-free reaction product thus hydrated with water may then be separated from the water and fractionated. If the aldehydic product obtained is to be processed into the corresponding alcohol, the same may be effected by hydrogenation in the conventional manner.

The hydration may be combined with the hydrogenation in a single operational step. For this purpose, it is advantageous to use a reduced cobalt catalyst. When using for the hydrating hydrogenation a different catalyst, as, for example, a nickel catalyst rather than a cobalt catalyst, then the cobalt carbonyl compounds dissolved in the aldehydic reaction product from the oxo synthesis must be removed in a suitable manner, as, for example, by treatment with acids.

The reaction product separated from the hydrogenation catalyst, and, if necessary or desired, from the water, is separated from solvent by topping and then fractionated. This will produce at least a 90% yield of tricyclodecane-methylol. This new alcohol is in the form a a clear, transparent, viscous liquid having a viscosity of 12° Engler at 50° C. The alcohol solidifies at −18° C. and has a boiling point at a pressure of 10 mm. mercury between 135° C. and 138° C. It may be assumed from the relatively narrow boiling range that the alcohol is a homogeneous alcohol.

The original mild hydrogenation will produce tricyclodecene $4[5,2,1,0^{2.6}]$. This compound has its unsaturated bond in the 4,5 position. The aldehydic group which may be converted to the alcoholic group will therefore be present at either the 4 or 5 position. Since the carbon atom neighboring the carbon atom in the 4 position is a secondary carbon atom and the carbon atom neighboring the carbon atom in the 5 position is a tertiary carbon atom, the addition of the carbon monoxide to from the aldehydic group will most probably occur at the 4 position. This is based on the known fact that the addition of carbon monoxide to a carbon atom neighboring a tertiary carbon atom is difficult. It therefore may be assumed with a high degree of probability that the tricyclodecane-methanol has its methanol group at the carbon atom in the 4 position and the same may be designated as tricyclodecane-[5,2,1,0$^{2,6}$]-methylol-4.

If the alcohol is not formed by the hydrogenation and the end product recovered is the aldehyde, the same will have its aldehydic group in the 4 or 5 position, and, most probably, the 4 position, and may most probably be designated as tricyclodecane-[5,2,1,0$^{2,6}$]-formaldehyde-4.

The new aldehyde and alcohol obtainable in accordance with the invention are suitable for various uses. For example, the same may be used as plasticizers, insulating liquids in electronics, brake oils, hydraulic oils, etc. By conventional chemical reactions they may be converted into further derivatives. The following example is given to further illustrate the invention and not to limit the same.

*Example 1*

1.2 liters of technical-grade dicyclopentadien and 1.2 liters of heptane were mixed with 100 cc. of a reduced nickel-magnesia-kieselguhr catalyst in the pressure vessel of 4 liters capacity provided with a stirrer. The catalyst consisted of 100 parts of nickel, 10 parts of magnesium oxide and 50 parts of kieselguhr. The reaction mixture was treated with hydrogen at a pressure of 50–100 kg. per square centimeter and a temperature of 70° C. 188 standard liters of hydrogen were absorbed within 30 minutes with a free gas space of 1.49 liters remaining in the pressure vessel. The quantity of hydrogen theoretically required for the saturation of a double bond of the dicyclopentadien was 199 standard liters. The mixture charged as the starting material had an ozone iodine number of 226 (according to Roelen and Noeske, see "Brennstoffchemie," volume 31, page 384 (1950)), while the partial hydrogenation was discontinued at an ozone iodine number of 131 because, according to experience, there will always occur a partial after-hydrogenation of approximately 10% of the ozone iodine number during the discharge of the reaction product. A final examination of the ozone iodine number resulted in the number 118 which corresponded to 50% of the initial ozone iodine number.

The partially hydrogenated reaction mixture was separated by filtration from the hydrogenation catalyst used and combined with 1.2 liters of an aqueous cobalt sulfate solution in a pressure vessel of 9.6 liters capacity. Prior to this, 0.1% hydroquinone had been added to the reaction mixture. The water gas addition was effected at a pressure of 150–200 kg. per square centimeter and at a temperature of 150° C. During the water gas absorption which lasted 180 minutes, a total of 400 standard liters CO+H$_2$ were consumed with the free gas space present in the pressure vessel being 6.1 liters.

After the termination of the water gas absorption, the autoclave was cooled and the aldehydic product was separated from the catalyst solution. Thereafter, 500 cc. of water were added and the reaction product was again heated for a short time in the autoclave to 200° C. and then allowed to cool. After having removed by filtration the precipitated metal hydroxides, the water-white aldehydic product which was free from acetals and metals was hydrogenated in conventional manner with a nickel catalyst. During the hydrogenation 120 standard liters of hydrogen were absorbed.

The hydrogenated reaction product was at first distilled under atmospheric pressure and freed from the heptane admixed. The product topped in this manner was then fractionated in a packed column of 50 cm. height at a pressure of 100 mm. Hg absolute.

90 percent by weight of the starting product were obtained as alcohol fraction. 5 percent by weight of a product containing tricyclodecane were obtained as first runnings. The residue from distillation amounted to approximately 5 percent by weight and consisted of esters and polymerization products. The alcohol fraction had the following characteristics:

Hydroxyl number _____ 340 (calculated: 342)
Density at 20° C. _____ 1.047
Refractive index $n_D^{20}$ _____ 1.5146

The working conditions which are used in the addition of carbon monoxide and hydrogen to the double bonds of dicyclopentadien, in accordance with the invention, correspond to the conventional reaction conditions of the oxo synthesis as disclosed, for example, by Otto Roelen in U.S.A. Patent 2,327,066 and other U.S. patents covering the oxo synthesis, and as may be seen from FIAT Final Report No. 1000. The catalyst may be, for example, an aqueous solution which contains per liter 16 grams of cobalt and 30 grams of MgO in the form of sulfates. The hydrogen ion concentration of this solution is adjusted by means of acids, preferably by the addition of sulfuric acid, to pH 3.5–5.5.

The hydrogenation of the primarily forming aldehyde mixtures is effected in the manner shown by Alder and Stein (see "Angewandte Chemie," vol. 47, pp. 837–842 (1934)). The hydrating hydrogenation is effected at 200–240° C. and a hydrogen partial pressure of 10–300 kg./sq. cm. with a catalyst which contains nickel, magnesium oxide and kieselguhr. The partial pressure of water vapor corresponds to the water vapor pressure at 200–240° C. and amounts to approximately 18–25 kg./sq. cm. Instead of nickel metal, catalysts which contain metallic cobalt may be used for the hydrating hydrogenation. The purification of the reaction products from cobalt carbonyl compounds still contained therein is likewise effected in the conventional manner with the use of acids such as, for example, sulfuric acid, nitric acid, oxalic acid or phosphoric acid (see "FIAT Final Report No. 1000"). Special measures for the removal of the undesirable metal content are not required in the hydrating hydrogenation since the metals precipitate already during the hydrogenation carried out in the presence of water vapor. Not only aldehydes and hydroxides, but other derivatives of dicyclopentadien may also be produced by the process according to the invention. These derivatives are compounds which may be produced in the conventional manner from aldehydes and alcohols. Carboxylic acids of dicyclopentadien may be produced by a subsequent treatment with melted alkali (e.g. NaOH) effected in the conventional manner at temperatures of approximately 250–350° C. It is also possible to produce esters in the conventional manner by saponification with inorganic or organic acids.

We claim:

1. As a new chemical compound, tricyclodecane-methylol.

2. As a new chemical compound, tricyclodecane-formaldehyde.

References Cited in the file of this patent

UNITED STATES PATENTS

| | | |
|---|---|---|
| 2,526,742 | Gresham | Oct. 24, 1950 |
| 2,548,159 | Houtman et al. | Apr. 10, 1951 |
| 2,564,130 | Schreyer | Aug. 14, 1951 |
| 2,571,160 | Parker et al. | Oct. 16, 1951 |
| 2,595,096 | Parker | Apr. 29, 1952 |
| 2,679,534 | Koontz | May 25, 1954 |
| 2,701,265 | Buchner et al. | Feb. 1, 1955 |
| 2,752,395 | Harvey et al. | June 26, 1956 |

FOREIGN PATENTS

| | | |
|---|---|---|
| 843,849 | Germany | July 14, 1952 |

OTHER REFERENCES

Alder et al.: Angewandte Chemie, 47, 837–42 (1934).

UNITED STATES PATENT OFFICE

CERTIFICATE OF CORRECTION

March 24, 1959

Patent No. 2,879,299  Karl Büchner et al.

It is hereby certified that error appears in the printed specification of the above numbered patent requiring correction and that the said Letters Patent should read as corrected below.

Column 2, line 54, for "a", first occurrence, read — of —; line 70, for "from" read — form —; column 3, line 25, for "in the" read — in a —; line 73, for "100 mm." read — 10 mm. —.

Signed and sealed this 7th day of July 1959.

(SEAL)
Attest:
KARL H. AXLINE
Attesting Officer

ROBERT C. WATSON
Commissioner of Patents